July 28, 1931. S. F. ACREE 1,816,135
METHOD OF CONVERTING WOOD INTO SUGAR AND OTHER PRODUCTS
Original Filed April 10, 1917
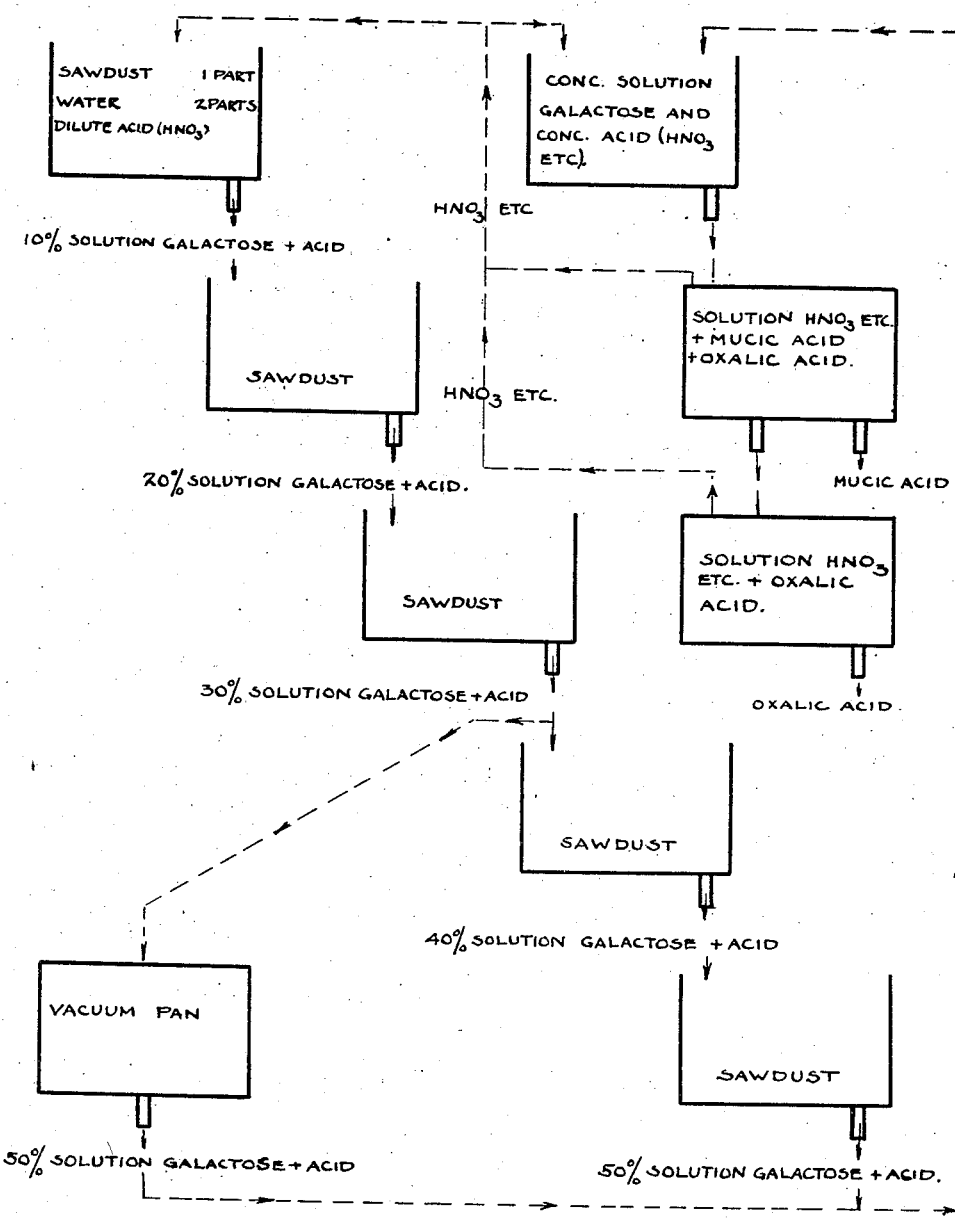
INVENTOR
Solomon F. Acree.
By Fay. Oberlin & Fay
ATTORNEYS.

Patented July 28, 1931

1,816,135

UNITED STATES PATENT OFFICE

SOLOMON F. ACREE, OF MADISON, WISCONSIN, ASSIGNOR OF ONE-TENTH TO ARTHUR B. FOSTER, OF WASHINGTON, DISTRICT OF COLUMBIA

METHOD OF CONVERTING WOOD INTO SUGAR AND OTHER PRODUCTS

Application filed April 10, 1917, Serial No. 458,133. Renewed April 2, 1921.

The hydrolysis of cane sugar, maltose, milk sugar or starch, either under the influence of mineral acids or enzymes, has been known and practiced for some time, as also the hydrolysis of still more complex carbohydrates found in various kinds of wood. However, so far as I am aware, the only process of hydrolysis, which has been successfully applied to the treatment of wood, involves the placing of the dry wood chips or saw-dust in a digester with approximately an equal amount of water, and with approximately 2 per cent of sulphuric acid, having reference to the dry weight of the wood. The temperature is then raised by admitting steam to approximately 140° C., after which the steam is blown off, leaving the product relatively dry, whereupon such product is transferred to an extractor where the sugar and residual acid are washed out, the latter neutralized, as, for example, with lime and the resulting precipitate filtered off, leaving the sugar in solution. The latter will consist largely of glucose and other hexoses, with some pentoses, of which substances, part only are fermentable, while there is the further disadvantage that the first step has to be carried on under pressure, in view of the temperature involved, and the extraction has to be carried out in a separate apparatus. Furthermore, as heretofore practiced, the degree of concentration obtainable has not been suited to production of anything but alcohol. Thus while glucose is readily fermentable it is considered necessary to employ the less readily fermentable products present, by oxidizing them to an organic acid.

The object of the present invention is to provide a process that can be carried on continuously, and that will produce a more highly concentrated solution of the sugar. At the same time I have discovered that it is possible, by my improved process, to work at a temperature lower than the boiling point of water, thus doing away with the necessity of using high pressure autoclaves for digesting the raw material. A further improvement comprehended in the present invention relates to the subsequent oxidation of the sugars to form the corresponding dibasic acid e. g. mucic acid from galactose. To the accomplishment of the foregoing and related ends, said invention, then, consists of the steps hereinafter fully described and particularly pointed out in the claims.

The annexed drawing and the following description set forth in detail one approved method of carrying out the invention, such disclosed mode, however, constituting but one of the various ways in which the principle of the invention may be used.

In said annexed drawing:—

The single figure there appearing represents diagrammatically the succession of steps involved in carrying out my improved process, having particular regard to the production of galactose and mucic acid from larch wood waste, e. g., from western larch (*Larix occidentalis*).

In the diagrammatic illustration found in the drawing the following pieces of apparatus are shown, their function being indicated in said drawing when taken with the appropriate description in the specification.

A is the first extraction and hydrolyzing vessel or cell: $A^1$, $A^2$, $A^3$, $A^4$, etc. are respectively the second, third, fourth, and fifth etc., extraction and hydrolyzing vessels, the particular number of said vessels in the entire battery being determined by the requirements of each plant. However, it is well in the case of large commercial plants to have in the battery system several such vessels.

The dotted lines P, $P^1$, $P^2$, $P^3$, etc., between the various pans or vessels indicate connections such as pipes or pipe lines.

B is a vacuum pan which may receive from any of the vessels $A^1$, $A^2$, $A^3$, etc., the sugar solution, such as one containing galactose which solution can be concentrated in said vacuum pan B. The concentrated solution can be then utilized as desired, for example being passed through the piping $P^1$ to the vessel C. which is used as a recovering and mixing vessel for the appropriate acids and oxides and sugars.

C is a generic diagrammatic illustration of a recovery tower system in which e. g. the oxides such as NO and $NO_2$ and the vapors of nitric and nitrous acids and of water com-

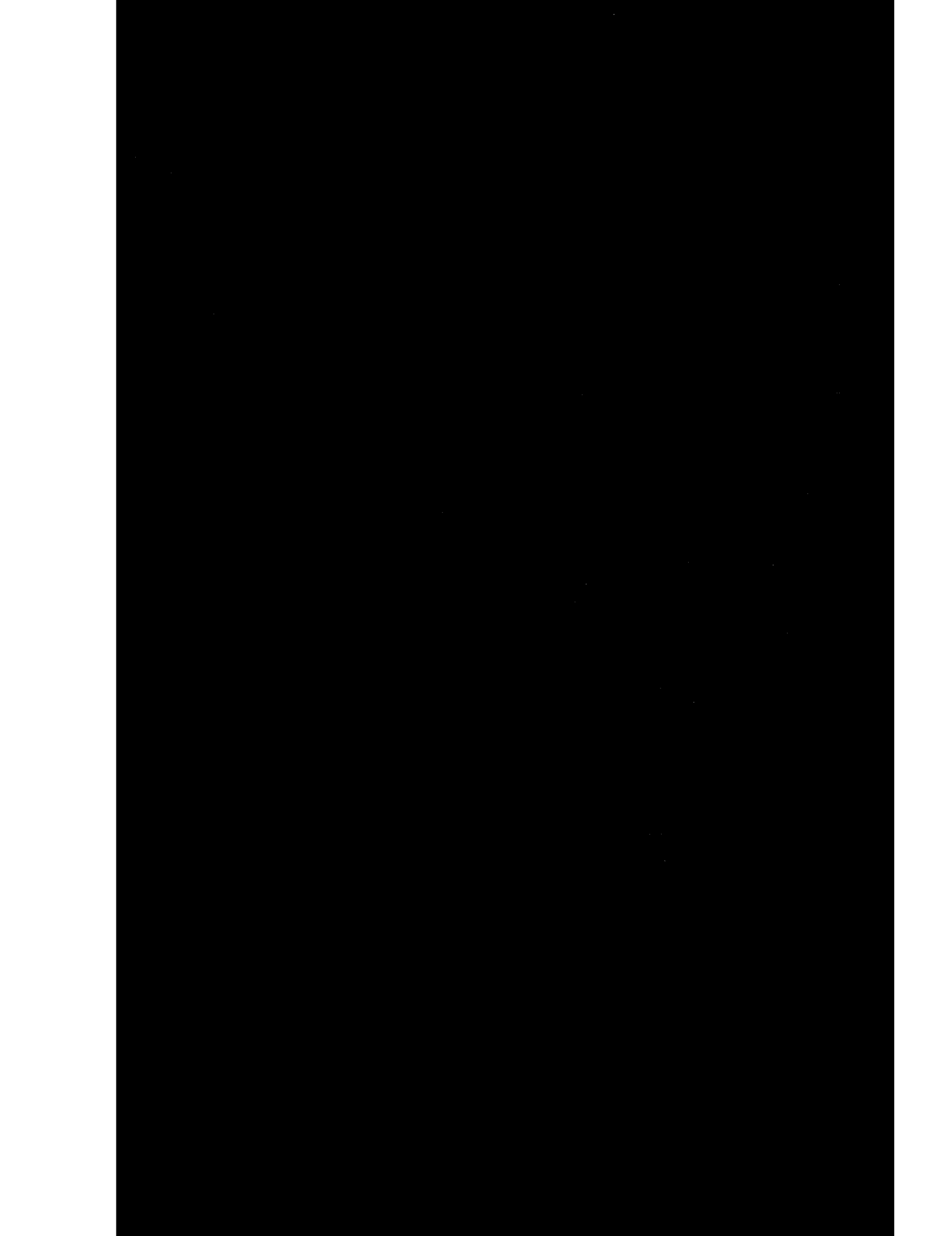

forming (in the first step) say about a five per cent. solution with the water that is present. From the first vessel (see the drawing) this solution may then be drained off and added to a quantity of fresh sawdust in a second vessel, the proportions being maintained approximately the same, and the new mixture heated as before, with the result that the further quantity of galactan in such second quantity of saw-dust is extracted and largely hydrolyzed into galactose, thereby forming about a ten per cent solution of the latter. The operation last described may then be repeated with a third quantity of saw-dust or wood in suitable form for treatment, and so on until, if desired, a solution is obtained containing a high per cent of the galactose. The spent galactan-freed chips in the first vessel are then washed and thrown out by proper actively moving machinery and replaced by fresh chips, the first cell thereupon becoming the last cell of the next series of battery extractions.

It is to be noted that as the drawing indicates at each step an amount of acid may be added whereby the proportions of water, acid and sawdust or chips are maintained approximately the same,—but the amount of sugar product (e. g. galactose) constantly increases.

Instead of securing a sugar solution of the desired degree of concentration in this way, the relatively weaker solution at any preceding stage (e. g., the third as shown on the drawing) may be concentrated in a suitable vacuum pan. Also it should be noted that the first part of the liquor passing through the wood at any stage will be more concentrated than that which passes through last, and if kept separate such first part may be transferred immediately to a later stage in the process.

The resultant solution, whichever specified series of steps is followed, will be quite light in color instead of being dark, as is the corresponding product in the present commercial process hereinbefore referred to, because the dark colored materials such as tannins originally present in the wood and associated bark are precipitated by the acid hydrolytic agent and subjected inevitably to filtration by the sawdust or chips and to clarification by the sludge formed when for example lime is used to neutralize the sulfuric or phosphoric acid. While the sugar present has been called galactose, it will be understood that I do not mean thereby to imply that it is all pure galactose, but merely that the original complex carbohydrate has been broken down into galactose and other intermediate forms which are amenable to further hydrolysis and to oxidation in a subsequent stage of the process. Furthermore, it is not meant to imply that only galactose is formed, for some glucose, etc., may result from the hydrolysis of other substances in the wood. Finally, it is to be noted that the degrees of concentration referred to above are suggestive rather than prescriptive.

In the foregoing described steps, the small quantity of acid present apparently acts as a catalytic agent, and so some acid is still left after the last treatment in the series, but may be recovered, or eliminated, in any well known way. Following the draining off of the solution in each of the vessels in which the final hydrolyzing step is thus carried on, the residue of the wood is preferably washed by proper machinery, or centrifuged and washed by proper machinery, to remove, any adhering solution of galactose and acid, and the spent wood is then thrown out from centrifuge or vessel and the vessel is then refilled with fresh chips, the weak solution thus obtained being preferably used in the first step of the next series of treatments of fresh wood.

The concentrated solution of galactose obtained in the manner just set forth is then oxidized at about 65° to 85° C., to mucic acid by adding thereto a mixture of the nitric ($HNO_3$) and nitrous ($HNO_2$) acids obtained from the nitric acid recovery towers, referred to below. The presence of the oxides ($NO$ and $NO_2$) is equally assistful with that of nitrous acid. Preferably the nitric acid is used in the proportion of about four to five parts by weight of 100% acid to one part of galactose in the sugar mixture the galactose itself requiring about 2 to 3 parts and the rest of the nitric acid being needed for the oxidation of the other sugar named above. The amount of nitrous acid (or of the oxides) present need not be large, and will vary during the operation, by reason of the reaction that takes place. During the oxidation reaction, part of the water, nitric acid, nitrous acid and oxides of nitrogen evaporate and are recovered again in suitable towers as concentrated or dilute solutions and partly as the salts of these acids, in a series of absorption or recovery towers. These solutions or the salts, are used again.

The mucic acid formed as a result of the reaction of the foregoing acid mixture with the galactose is very insoluble in water and so precipitates out. There is also formed a small quantity of oxalic acid and perhaps other organic acids such as saccharic acid. These acids may be allowed to remain in the solution, which also contains at the end of the reaction part of the nitric and nitrous acids, and the same solution called mother liquor is employed over again in treating a further quantity of fresh wood or the galactose solution; until finally the amount of oxalic acid in the solution will accumulate to a point where it can be profitably crystallized out.

The mucic acid after proper purification is obtained in a flaky or granular form, or in a mixture of these two forms, depending upon conditions, and is available for use either as such or as an ingredient for various compounds, or as the basis for further reactions in order to produce allomucic, talomucic and tartaric acid, for example, all as need not be here described, as such further uses and treatment form no part of the present invention.

The relatively small amount of acid required in the hydrolyzing stage, as well as the low temperature, characterizing my improved process, distinguish the latter from the present commercial process, which is not nearly so convenient or advantageous in operation. I also emphasize the importance of the discovery that the admixture of nitrous acid (or oxides of nitrogen) to the nitric acid, heretofore known as an oxidizing agent in connections such as here involved, greatly facilitates the oxidation and renders it more complete that is to illustrate, nitric acid containing only the usual small traces of nitrous acid, oxides of nitrogen (NO and $NO_2$) etc., is very slow and uncertain in oxidizing action, which action can be entirely prevented by substances such as urea which remove or destroy these traces of nitrous acid and oxides and etc.: Whereas the nitrous acid and oxides of nitrogen in predetermined amounts as set forth in this application not only readily react upon and oxidize such organic compounds but also enable the nitric acid to furnish oxygen to oxidize into the final stages of oxidation any intermediate compounds formed by the action of the nitrous acid and oxides of nitrogen on such organic compounds. The term nitrous acid, as hereinafter used in the claims, is to be understood as comprehending such oxides as well, wherever the context so admits. In the case of the hydrolyzing stage, the nitrous acid, while not essential, is about as good an agent as the nitric acid, so that the process may be made a closed cycle of steps, as above described, so far as concerns the use over and over again of the acid reagent i. e. the nitric and nitrous acids and oxides of nitrogen.

It should be added, in conclusion, that the galactose may of course be utilized in other ways than to form mucic acid. Thus it may, by use of proper yeasts, or enzymes, be converted into ethyl alcohol, such yeasts or enzymes having obviously greater fermenting power than the ordinary yeasts which ferment the glucose in these sugar mixtures very readily but the galactose very slowly.

Other modes of applying the principle of my invention may be employed instead of the one explained, change being made as regards the method herein disclosed, provided the step or steps stated by any one of the following claims or the equivalent of such stated step or steps be employed.

As used in the claims filed in the amendment of even date herewith the terms "small amount of acid" or "weak acid" or "small per cent of acid" are intended to cover such concentrations as are disclosed herein and particularly such concentrations around one per cent or less of the acid or hydrolytic agent. Similarly the term "moderate temperature" is intended to cover temperatures of the nature of 70–90° C. more specifically referred to herein although it should be recognized that such temperatures are indicative of the preferred temperatures and not necessarily limiting in the very nature of this disclosure.

The term "hydrolytic agent containing chlorin as active hydrolytic agent" includes either free chlorine as such or compounds which produce chlorine during the reaction. And similarly the term "galactose yielding substance" is intended to cover galactan, galactose, or other substances which generate galactose.

The term "containing" as used in certain of the composition or product claims herein is intended to be broad, to include "consisting of", "comprising", or "embracing", namely the said term includes the cases where other material is present as well as the case where no other material is present.

I therefore particularly point out and distinctly claim as my invention:—

1. The method of treating cellulosic substances which comprises subjecting the cellulosic substance containing galactan in substantial proportion to the action of a hydrolytic agent containing weak acid solution at below the boiling point of water.

2. The method of treating wood from western larch which comprises subjecting the wood to the action of a hydrolytic agent containing weak acid solution at a temperature below the boiling point of water.

3. The method of treating western larch which comprises subjecting comminuted western larch wood to the action of a hydrolytic agent containing an acid solution of less than one per cent concentration.

4. The process of claim 3 carried out at a temperature of 70 to 90° C.

5. The method of treating western larch which comprises subjecting the larch to the action of a hydrolytic agent containing a weak acid solution, withdrawing the solution containing coloring matter derived from the larch, and removing coloring matters from the solution.

6. The process of extracting wood which comprises treating comminuted western larch wood with a small percent of a hydrolytic agent in the presence of water, drawing off the resulting galactose solution containing residual hydrolytic agent, treating a fresh quantity of such comminuted wood with such withdrawn solution, and repeating these steps to increase the concentration of the galactose in the solution.

7. The process of extracting wood containing galactan which comprises treating wood with an aqueous solution of a hydrolytic agent, removing the resultant solution containing hydrolyzed products and coloring matter, and removing the coloring matter from that solution.

8. The process of treating wood products which comprises extracting galactan from western larch by means of an aqueous extracting agent incapable of spoiling the wood or the extract, separating the extract from the larch material, again extracting the same batch of western larch with an extracting agent of different composition from that used in the first step, and repeating this extraction until substantially all of the water soluble material has been removed from the fibrous material, and then separating the final extract from the residual fibrous material.

9. The method of extracting carbohydrates which comprises treating western larch with hydrolytic agents in a series of successive steps, a different hydrolytic agent being used in each step from that used in the previous step.

10. The process of obtaining valuable materials from western larch which comprises subjecting western larch in a comminuted condition to the action of an extracting agent not capable of spoiling the larch but capable of extracting valuable components herefrom at a moderate temperature.

11. The process of obtaining valuable materials from western larch which comprises simultaneously extracting western larch and hydrolyzing the extracted material.

12. The process of recovering valuable products from western larch which comprises simultaneously extracting western larch and hydrolyzing the extracted material by means of a hydrolytic and solvent agent comprising water and a weak acid, at a temperature not substantially above 100° C.

13. The process of producing a fibrous material from western larch which comprises subjecting comminuted western larch wood to the action of a hydrolytic agent including water as a constituent, and separating the residual fibrous material.

14. The process of producing an extract containing galactan and a fibrous material from western larch which comprises subjecting western larch in a comminuted condition to the action of an aqueous leaching agent.

15. The process of recovering valuable products from western larch which comprises subjecting the western larch in a comminuted condition to the action of waste sulphite liquor containing a small amount of an active hydrolytic agent of an acid character in a considerable amount of water, allowing the reaction to proceed until substantially all of the soluble non-fibrous compounds have been removed from the chips, separating the liquor containing galactose, and recovering the residual fibrous material.

16. The process of recovering valuable products from western larch, which comprises subjecting comminuted western larch wood to the action of an aqueous acid extracting agent to form an extract containing galactose, and reusing the extract containing galactose and acid to extract further quantities of comminuted western larch wood.

17. The process as set forth in claim 8 which is further modified by combining the extracts, and subjecting the resulting material to concentration in vacuo.

18. The process as set forth in claim 16 wherein the residual acid is removed from the final extract.

19. The process of producing valuable products which comprises treating western larch with a hydrolyzing agent in solution, withdrawing the resulting solution containing galactose, and treating a fresh quantity of western larch with the resulting solution.

20. The process of producing valuable products which comprises subjecting a galactose yielding substance to the action of a leaching liquid containing nitric and nitrous acids.

21. The process of producing valuable products which comprises subjecting western larch chips to treatment with an acid-reacting hydrolyzing agent, concentrating the resulting liquor, hydrolyzing the concentrate, and recovering the fibrous residue.

22. The process of producing valuable products which comprises subjecting western larch chips to treatment with an acid-reacting hydrolyzing agent, removing the excess acid from the resulting liquor, then subjecting the substantially acid-freed liquor to concentration, and then to hydrolysis, and recovering the fibrous residue.

23. A product derived from western larch which comprises galactan, galactose, glucose, and pentoses, the galactose predominating.

24. A product derived from western larch which comprises galactose and glucose, the galactose predominating.

25. The method of purifying galactan extracts obtained from the wood of western larch from contained tannin which comprises heating such extracts with acids capable of bringing about the precipitation of the tannins, and separating the precipitated tannins from the extracts.

26. In a process of the character described, the steps which consist in treating a quantity of western larch in the presence of water with a hydrolytic agent, and drawing off the resulting galactose solution with residual hydrolytic agent.

27. A composition of matter containing the composite sugar products of hydrolysis of western larch wood including galactose in a concentrated state.

28. The method of converting western larch into sugar, which consists in treating the same with water and a hydrolytic agent at below 140° C.

29. The method of converting western larch into sugar, which consists in treating the same with water and a hydrolytic agent below 100° C.

30. The method of converting western larch into sugar, which consists in treating the same with water and acid in amount capable of acting as a hydrolyzing agent on galactan at below 140° C.

31. The method of converting western larch into sugar, which consists in treating the same with water and acid in amount capable of acting as a hydrolyzing agent on galactan at below 100° C.

32. The method of converting western larch into sugar, which consists in treating the same below 140° C., with water containing a hydrolytic agent in amount less than 6 per cent of the dry weight of such western larch.

33. The method of converting western larch into sugar, which consists in treating one part of western larch at below 140° C., with approximately three parts of water containing nitric and nitrous acids in amount less than 6 per cent of the dry weight of such western larch.

34. The method of converting western larch into sugar, which consists in treating one part of western larch at below 140° C., with approximately three parts of water containing nitric acid in amount less than 6 per cent of the dry weight of such western larch.

35. In a battery process of the character described, the steps which consist in treating a quantity of western larch in the presence of water with a hydrolytic agent in amount capable of converting galactan into galactose, drawing off the resulting sugar solution with residual hydrolytic agent, and then treating a second quantity of such western larch with such solution, and so on until a solution of desired degree of concentration is obtained by hydrolyzing the fresh wood in the last cell, and removing the sugar solution from such last cell.

36. As a new composition of matter, a mixture of hydrolyzed galactan, galactose, glucose, pentoses, and tannin materials obtained by hydrolyzing western larch.

37. As a new composition of matter, a mixture of hydrolyzed galactan, galactose, glucose, pentoses, and tannin materials obtained from western larch, in which the galactose-bearing constituents represent more than 25 per cent of the total sugars.

38. As a new composition of matter, a mixture of hydrolyzed galactan, galactose, glucose, pentoses, and tannin materials obtained from western larch, in which the galactose-bearing constituents represent more than 50 per cent of the total sugars.

39. As a new composition of matter, a mixture of hydrolyzed galactan, galactose, glucose, pentoses, and tannin materials obtained from western larch by treatment with water and a hydrolytic agent below 140° C.

40. As a new composition of matter, a mixture of hydrolyzed galactan, galactose, glucose, pentoses, and tannin materials obtained from western larch by treatment with water and a hydrolytic agent below 100° C.

41. A novel composition of matter containing the composite sugar products of hydrolysis of western larch wood including d-galactose in amount much greater than all other sugars present therein, such product being in a concentrated state and containing no substantial quantity of active hydrolytic agent.

42. A process of making commercial products from western larch, which comprises lixiviating western larch wood and concentrating the extract.

43. A process of making commercial products from western larch which comprises lixiviating western larch waste material, removing tannins from the extract and concentrating the extract.

Signed by me this 4th day of April, 1917, at Chicago, Ill.

SOLOMON F. ACREE.